I. W. McCALLUM.
CULTIVATOR.
APPLICATION FILED JULY 5, 1912.

1,252,128.

Patented Jan. 1, 1918.
4 SHEETS—SHEET 3.

Witnesses.
Robert H. Kammler.
Horace A. Crossman.

Inventor:
Ingersoll W. McCallum.
By Emery, Booth, Janney & Varney
Attys.

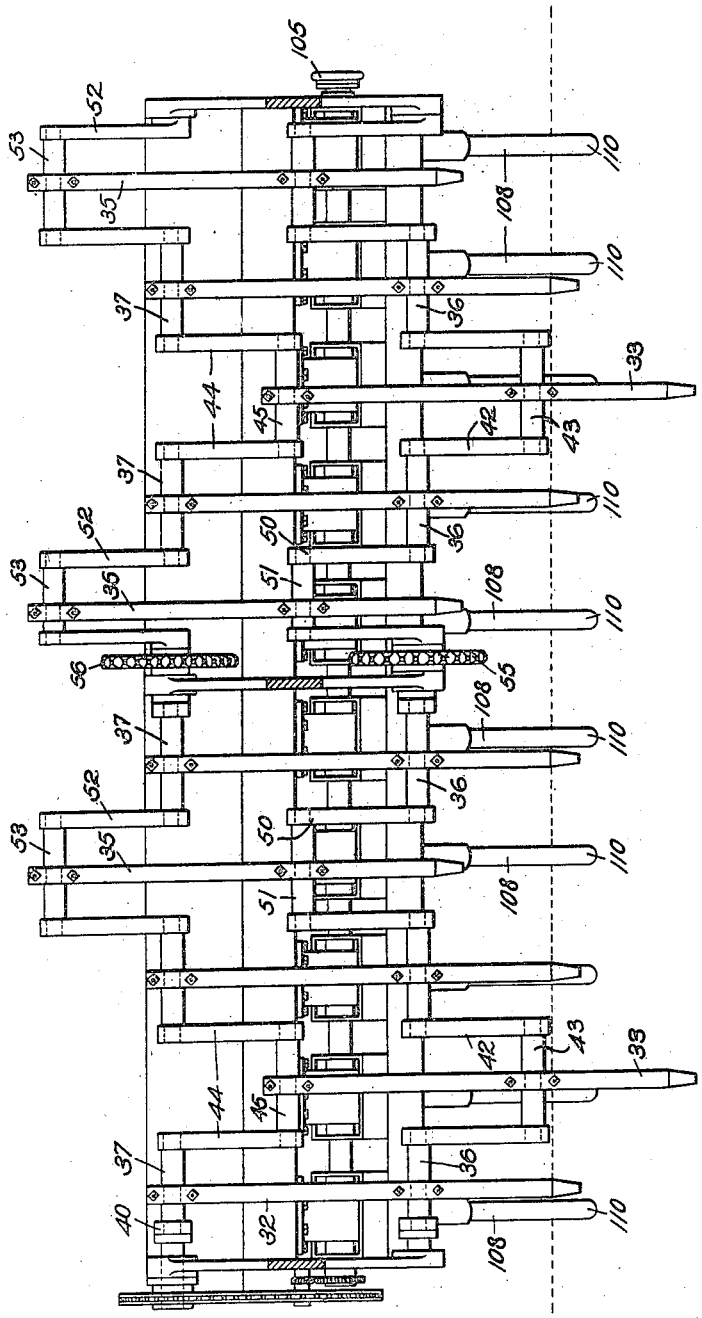

UNITED STATES PATENT OFFICE.

INGERSOLL W. McCALLUM, OF CAMBRIDGE, MASSACHUSETTS.

CULTIVATOR.

1,252,128.

Specification of Letters Patent. Patented Jan. 1, 1918.

Application filed July 5, 1912. Serial No. 707,863.

*To all whom it may concern:*

Be it known that I, INGERSOLL W. McCALLUM, a subject of the King of England, and a resident of Cambridge, in the county of Middlesex and State of Massachusetts, have invented an Improvement in Cultivators, of which the following description, in connection with the accompanying drawings, is a specification, like characters on the drawings representing like parts.

My invention relates to cultivators and planters, and will be best understood by reference to the following description when taken in connection with the accompanying illustration of one specific embodiment thereof, while its scope will be more particularly pointed out in the appended claims.

In the drawings:

Fig. 4 is a sectional view partly in elevation on the line 4—4 of Fig. 3.

Figure 1:
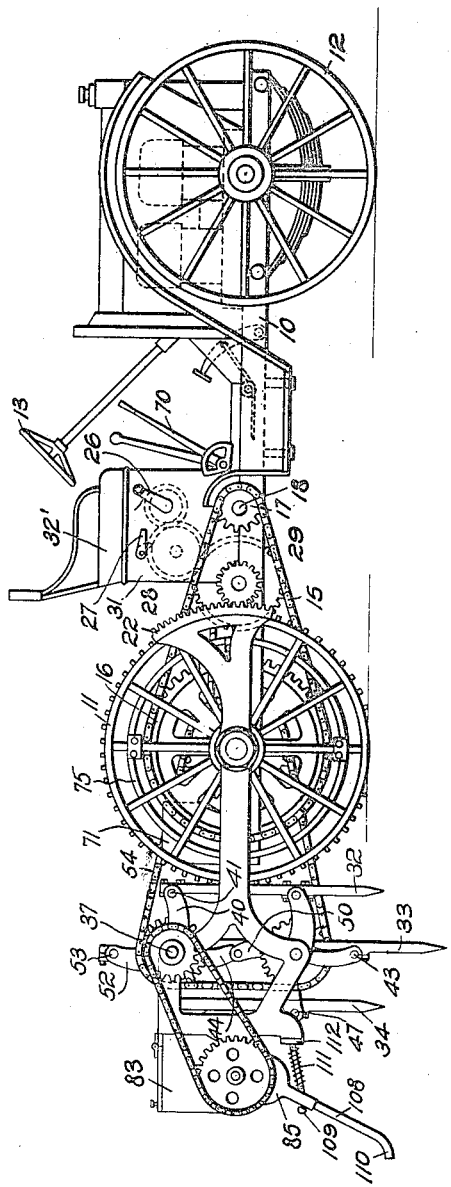
Figure 1 is a side elevation of one embodiment of my invention.
Figure 2:
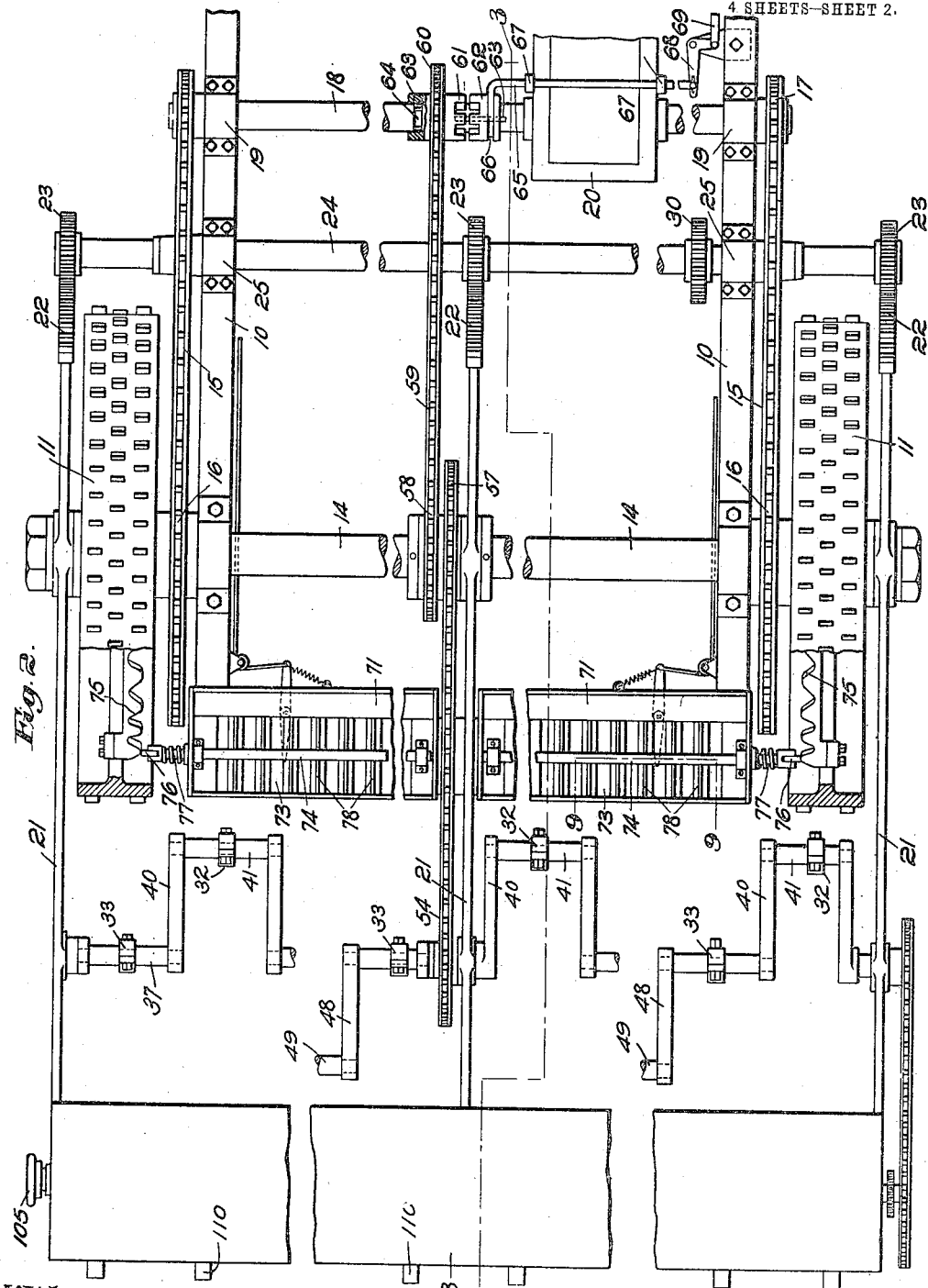
Fig. 2 is a plan view of a portion of the machine on an enlarged scale partly broken away.
Figure 3:
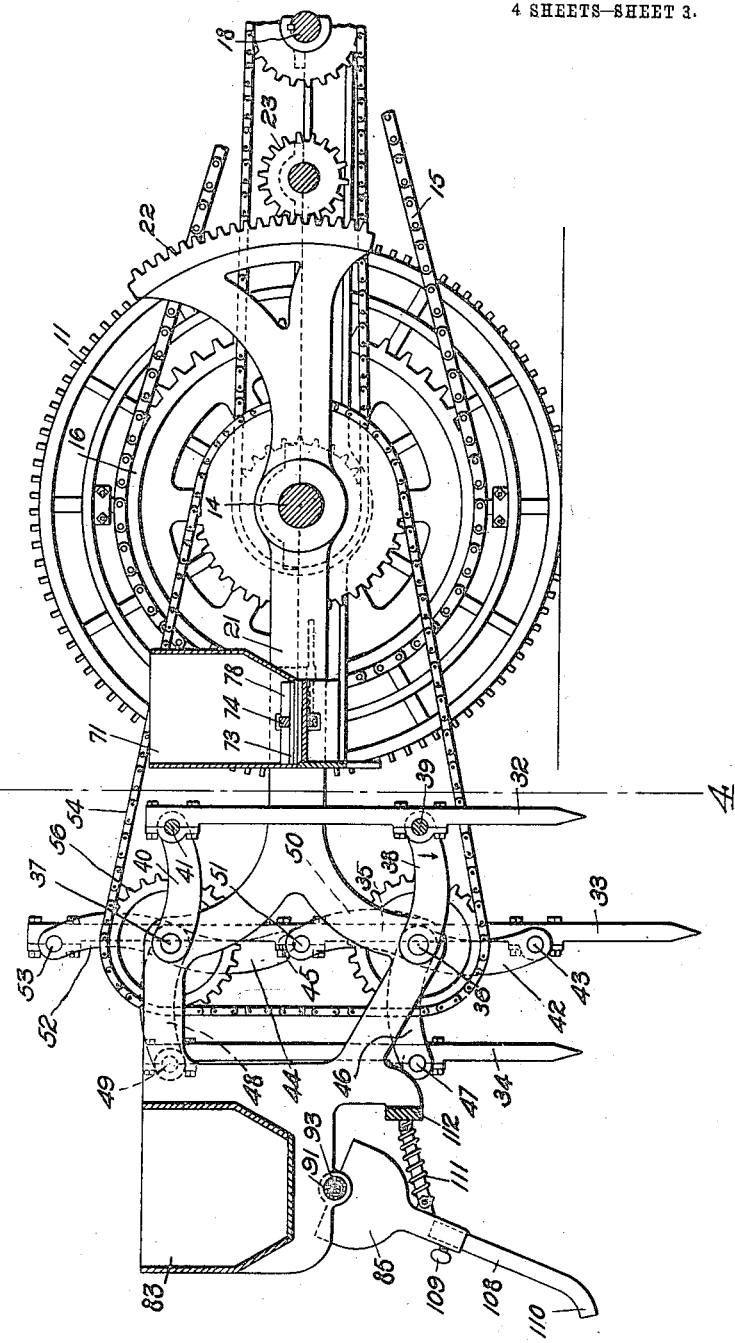
Fig. 3 is a longitudinal vertical section on the line 3—3 of Fig. 2.

Referring to the drawings and to the embodiment of my invention which I have there disclosed for illustrative purposes, I have there shown a cultivator and planter comprising a vehicle, herein of the self-propelled type, having a frame 10 mounted upon suitable driving wheels 11—11 and suitable steering wheels 12—12, the latter being controlled as is usual in self-propelled vehicles by a steering wheel 13. The driving wheels 11 may be driven in any suitable manner, herein being loosely mounted upon a fixed axle 14, and separately driven by chains 15—15, connecting sprocket wheels 16—16 on said wheels, with sprocket wheels 17—17 on opposite ends of a divided jackshaft 18, the latter being journaled in suitable bearings 19—19, provided on the frame 10 and extending into a transmission gear casing 20. As is usual with motor vehicles, this casing may contain differential gearing permitting the differential action of the driving wheels, and suitable change gearing for changing the ratio of the gearing between the usual engine and the rear driving wheels. These parts just referred to, however, are not essential to the illustration of my present invention, and it will be unnecessary to show and describe them herein.

The vehicle carries at its rear portion suitable means for supporting the cultivating devices, and herein comprising one or more levers 21, herein three in number fulcrumed upon the rear axle 14 to swing in vertical planes so as to permit the adjustment of the cultivating devices hereinafter described toward and away from the ground. For the purposes of adjustment the levers 21 are preferably provided at their forward ends with segmental gears 22, meshing with pinions 23 secured to a shaft 24 journaled in suitable bearings 25 on the frame 10. The shaft 24 may be rotated by any suitable means conveniently located for manual operation, and herein comprising a crank 26 connected to said shaft by a suitable train of gears furnishing a leverage permitting the weight carried by the levers 21 to be easily lifted by manual operation. Herein this train of gears comprises a gear 27 secured to the crank 26 and meshing into a larger gear 28; to the latter is secured a smaller gear 29, which meshes with a gear 30 secured to the shaft 24. By the means just described, the rear ends of the levers 21 may be raised or lowered as may be desired by the rotation of the crank 26 in the proper direction. As a means for locking the levers in the desired position of adjustment, I have provided suitable means, herein a pawl 31.

These parts just described are preferably conveniently located beneath a seat 32 for the operator of the machine, and the crank 26 and pawl 31 are readily accessible at the side of the seat for easy manipulation at the will of the operator.

The levers 21 carry suitable cultivating devices, preferably a plurality of picks having suitable means to impart a downward and lateral movement thereto. In the present instance, I have chosen to employ a plurality of sets of picks, herein four sets, 32, 33, 34 and 35. These picks are given a downward rearward movement to embed them in the earth, and then an upward movement to withdraw them therefrom by suitable mechanism, herein comprising two crank shafts 36 and 37, located one above the other. The picks of each set are given their desired movement by the conjoint action of the two crank shafts. To this end, the crank shaft 36 is provided with a plurality of crank arms 38 having crank pins 39 journaled in suitable bearings provided in the picks 32, and the crank shaft 37 is provided with corresponding crank arms 40, having crank pins 41 journaled in suitable bearings in the picks 32. In like manner, the crank shaft 36 is provided with another set of crank arms 42, having crank pins 43 journaled in suitable bearings in the picks 33, and the crank shaft 37 is similarly provided with crank arms 44, having crank pins 45 also journaled in suitable bearings in the picks 33. In like manner the crank shaft 36 is also provided with crank arms 46, having crank pins 47 journaled in suitable bearings in the picks 34, and similarly the crank shaft 37 is provided with crank arms 48, having crank pins 49 also journaled in suitable bearings in said picks. The crank shaft 36 is further provided with crank arms 50, having crank pins 51 journaled in suitable bearings in the picks 35, and similarly the crank shaft 37 is provided with crank arms 52, having crank pins 53 also journaled in suitable bearings provided in said picks.

All of the picks hereinbefore described are suitably shaped at their lower extremities, herein being provided with sharp points or teeth suitably shaped to enter the earth.

It will now be evident that if the crank shafts 36 and 37 are rotated in unison in the proper direction, the points of the various sets of picks just described will be given a circular motion in their respective vertical planes, and will consequently be driven downwardly and rearwardly into the ground, then withdrawn upwardly and rearwardly, and then carried forwardly and upwardly into position to be again thrust into the ground as before. Obviously this motion will tear up the earth rapidly and prepare the same for the reception of the seeds where the machine is used for planting, and of course the machine may be used for cultivating the earth between rows of previously grown plants in a manner which will be readily understood.

The crank shafts 36 and 37 may be rotated in unison in the same direction by any suitable means, but I prefer to employ for this purpose an endless chain 54 engaging sprocket wheels 55 and 56 secured to the crank shafts 36 and 37, and driven by a sprocket wheel 57 journaled upon the rear axle 14. Secured to the latter sprocket wheel is a second sprocket wheel 58 engaged by a chain 59, driven by a sprocket wheel 60 loosely mounted on the jack shaft 18. The sprocket wheel 60 may be driven in any suitable manner, preferably by providing the same with a suitable clutch member 61 adapted to be engaged by a similar clutch member 62. The latter clutch member is slidably, but non-rotatably mounted on the shaft 18, by means of the spline or feather 63, so as to be capable of being moved into and out of inter-engagement with the clutch member 61. The clutch member 61 and sprocket wheel 60 are held against longitudinal movement on the shaft 18 by suitable means, as for example a pin or screw 63, projecting into a circumferential groove 64, provided in the shaft 18. The clutch member 62 may be moved into and out of driving engagement with the clutch member 61 by any suitable means, such for example as a clutch shifter 65 engaging the circumferential groove 66 provided in the clutch member 62, said clutch shifter being mounted to slide longitudinally in suitable bearings 67 provided on the transmission gear casing 20. The clutch shifter may be actuated in any suitable manner, as for example by means of a bell crank lever 68, having one arm connected thereto and having its other arm connected to a rod 69, extending forwardly and suitably connected to a manually operable lever 70, conveniently located at the side of the seat 32. By this means the crank shafts 36 and 37 may be connected to and driven by the shaft 18, or disconnected therefrom at the will of the operator.

It will be readily understood from the foregoing that the picks may be adjusted to any desired height within the range of adjustment of the mechanism, so as to enter the ground to the desired extent or to clear the ground entirely. It will also be apparent that the picks may be instantly thrown into and out of action, while the machine advances along the ground. It will therefore be evident that the picks may be advanced to cause their engagement with successive portions of the ground in such a manner as to loosen, break, and pulverize the earth and throw the latter rearwardly over the seeds.

Suitably supported on the machine, and preferably upon the frame 10 at the front of the pick mechanism, is a fertilizer hopper, or a plurality of hoppers 71, herein two, each having one or more outlets 72. These outlets may be controlled by shutters 73 carried to and fro across the opening by suitable means herein rods 74—74, which are given longitudinal reciprocative movements by cams 75—75, carried by the wheels 11—11 respectively, and engaging cam rolls 76—76 journaled on the rod 74—74 respectively. These cam rolls are held in operative engagement with their respective cams by suitable springs 77—77. If desired, the hoppers may be provided with suitable agitators to agitate the fertilizer therein. In the present instance, I have chosen to employ for this purpose a plurality of transverse plates 78, secured to each of the rods 74 in the spaces between the shutters 73, and so arranged as to agitate the fertilizer to cause the same to be properly fed through the outlets 72 when the shutters 73 are moved out of register with the latter. Carried by the machine on a suitable support, as for example on the levers 21, is a seed hopper 83, provided with one or more outlets, herein in the form of chutes 85, the latter being preferably made laterally yielding, as for example being pivoted at 91 in such a manner as to permit the chutes to swing in vertical planes about the axes of the pivots. Preferably, the chutes 85 are provided with adjustable spouts 108, entering the lower ends of said chutes, and normally held in the desired position of adjustment by suitable means, as for example set screws 109. These spouts are preferably curved or inclined rearwardly at their lower extremities, as, for example, shown at 110, so as to be capable of dragging along in the furrows and delivering the seeds to the latter without clogging. Preferably, also, the chutes 85 and their spouts 108 are provided with suitable yielding means tending to restrain them in their rearward movement, such means comprising suitable springs 111, secured to the spouts and to a cross bar 112 on the levers 21. By this means, the spouts are compelled to drag along in the previously pulverized earth, and yet are capable of yielding and riding over any obstruction or irregularities of the ground which may be encountered thereby. Preferably, the chutes with their spouts will correspond in number and position to the picks hereinbefore described, so as to feed the seeds to the earth, which has been opened up by the picks.

An important feature of my invention is that the spouts 108 constitute a screen or barrier against which the earth is thrown rearwardly by the picks. In the operation of the machine, the earth clods, as they are thrown rearwardly by the picks, strike the chutes, which cause the clods to be broken and pulverized. Another important feature is that the clods, as they are thus pulverized or broken up, naturally fall directly upon the seeds deposited by the spouts.

While I have herein shown and described one form of my invention for illustrative purposes, and have disclosed and described in detail the construction and arrangement incidental to one specific application thereof, it is to be understood that the invention is limited neither to its specific embodiment herein shown nor to the mere details or relative arrangement of parts, but that extensive deviations from the illustrated form or embodiment of the invention may be made without departing from the principles thereof.

Claims:

1. In an apparatus of the class described, the combination of a vehicle, earth-cultivating means carried by said vehicle and adapted to throw the earth in a generally horizontal direction, means forming a barrier against which the earth is thrown, and yielding means tending to urge said barrier against the ground.

2. In an apparatus of the class described, the combination of a vehicle, earth cultivating means carried by said vehicle and adapted to throw the earth in a generally horizontal direction, means forming a barrier against which the earth is thrown, and yielding means tending to move said barrier in a forward and downward direction.

3. In an apparatus of the class described, the combination of a vehicle having propelling wheels 11—11, earth-cultivating means 32, 33, 34 and 35, carried by said vehicle at the rear of said driving wheels and adapted to throw the earth in a generally horizontal direction, means 108 forming a barrier against which the earth is thrown, and yielding means 111 tending to move said barrier in a forward and downward direction.

In testimony whereof I have signed my name to this specification, in the presence of two subscribing witnesses.

INGERSOLL W. McCALLUM.

Witnesses:
Louis A. Jones,
Clara L. Stuart.

Copies of this patent may be obtained for five cents each, by addressing the "Commissioner of Patents, Washington, D. C."